M. O. TROY.
PROTECTION FOR ELECTRICAL SYSTEMS.
APPLICATION FILED SEPT. 24, 1907.
1,025,846.
Patented May 7, 1912.
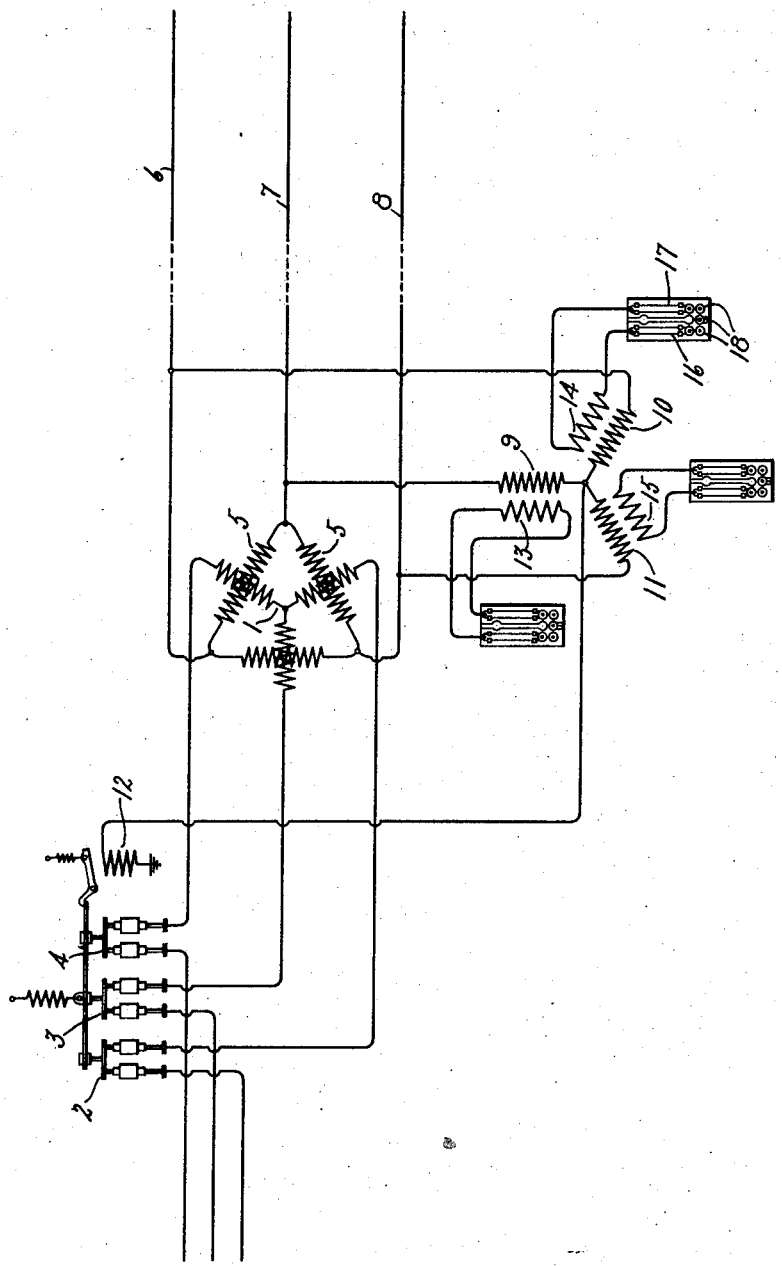
Witnesses:
George W. Tilden
J. Ellis Glen
Inventor:
Matthew O. Troy,
by Albert G. Davis
Att'y.

UNITED STATES PATENT OFFICE.

MATTHEW O. TROY, OF SCHENECTADY, NEW YORK, ASSIGNOR TO GENERAL ELECTRIC COMPANY, A CORPORATION OF NEW YORK.

PROTECTION FOR ELECTRICAL SYSTEMS.

1,025,846.  Specification of Letters Patent.  Patented May 7, 1912.

Application filed September 24, 1907. Serial No. 394,279.

*To all whom it may concern:*

Be it known that I, MATTHEW O. TROY, a citizen of the United States, residing at Schenectady, county of Schenectady, State of New York, have invented certain new and useful Improvements in Protection for Electrical Systems, of which the following is a specification.

My present invention relates to the protection of electrical systems, and more particularly to the protection of distribution circuits when a partial or complete break down occurs in the high voltage transformers supplying energy thereto.

According to my invention, the distribution or low potential part of the system is provided with means for conducting to ground any high potential energy which may leak through the transformer insulation. Under certain conditions, this protective means serves to entirely disconnect the high potential windings of the transformers from their source of supply.

The details of my invention will be better understood by reference to the following description taken in connection with the accompanying drawing.

In the drawing is illustrated a transformer, or bank of transformers, having high potential windings 1 connected with a source of energy by means of switches 2, 3 and 4, say of the oil-break type. The transformer secondaries 5 serve to supply energy to a distribution network not shown. Across the distribution conductors, 6, 7 and 8 of the secondary network is connected an impedance device composed of three Y-connected coils 9, 10 and 11. The neutral of this impedance device is connected to ground through a coil 12 which serves as a tripping coil for the oil switches 2, 3 and 4. The impedance coils 9, 10 and 11 are provided, respectively, with secondaries 13, 14 and 15, each short-circuited on itself through a spark gap device such as an ordinary lightning arrester, comprising resistance sticks 16 and 17 and spark gap cylinders 18.

In case of a partial break down in the transformer insulation, energy from the transformer windings 1 may pass over to the secondaries 5 and the connected network. Under ordinary conditions, this energy will discharge through the Y-connected impedance and its grounded neutral, and will thereby be prevented from doing damage elsewhere on the conductors 6, 7 and 8. This leakage or static current will not ordinarily be sufficient to operate the tripping coil 12 and open the oil switches 2, 3, and 4. If, however, the high potential circuit should simultaneously happen to be partially grounded, as on trees or through bad insulators, so that considerable energy would tend to pass through the Y-connected impedance, then the tripping coil 12 will open the oil switches and shut off the power.

In case of a bad ground on the primary circuit and a bad break in the transformer insulation, the voltage across the Y-connected impedance may tend to rise to a value dangerous to the coils. To prevent such a rise I make use of the secondary coils 13, 14 and 15, and their coöperating spark gaps and resistances. Whenever the current flowing through the Y-connected reactive coils 9, 10 and 11 exceeds sufficiently the exciting current of the windings, the voltage across the secondary windings 13, 14 and 15 increases sufficiently to initiate a discharge across the gaps at cylinders 18. The current discharging across the gaps and flowing in the secondary winding reduces the impedance of the primary winding and prevents damage thereto during the brief interval of time necessary for operation of the tripping coil 12 and oil switches 2, 3 and 4.

What I claim as new and desire to secure by Letters Patent of the United States, is,—

1. The combination with an electric conductor, an automatic switch in circuit with said conductor, and electroresponsive means for tripping said switch, of an impedance coil connected to said conductor and through said electroresponsive means to ground and means for preventing an abnormal rise of potential on said impedance coil in case of a heavy flow of current through said coil.

2. The combination with a plurality of electrical conductors, an automatic switch in circuit with said conductors, and current responsive means for tripping said switch, of impedance coils connected across said conductors and having a neutral point, a ground connection through said current responsive means to said neutral point, and means for preventing an abnormal rise of potential on said impedance coils in case of a heavy flow of current therethrough.

3. The combination with a plurality of current distributing conductors, an automatic switch in circuit with said conductors, and a trip coil for tripping said switch, of a plurality of impedance coils connected across said conductors to a neutral point, a ground connection from said neutral point through said trip coil, and an auxiliary winding in inductive relation with each of said impedance coils and adapted to take current when the voltage thereon reaches a predetermined value.

4. The combination with a plurality of distributing conductors, an automatic switch in circuit with said conductors, and a trip coil for tripping said switch, of a plurality of impedance coils connected across said conductors to a neutral point, a ground connection through said trip coil to said neutral point, and a secondary winding for each of said impedance coils, each of said windings having its terminals connected by a spark gap path.

5. In an electrical system, the combination of high potential windings insulated from low potential windings, automatic switches in circuit with said high potential windings, impedance devices connected across said low potential windings, a path from said impedances to ground for energy leaking across from said high potential windings to said low potential windings, current responsive means in said path for operating the switches of the high potential windings when the current to ground reaches a predetermined value, and secondary windings for said impedances short circuited in response to abnormal potential to prevent a dangerous increase in potential on said impedance devices in case of a heavy flow of current through said ground connection.

In witness whereof, I have hereunto set my hand this 23rd day of September, 1907.

MATTHEW O. TROY.

Witnesses:
BENJAMIN B. HULL,
HELEN ORFORD.

Copies of this patent may be obtained for five cents each, by addressing the "Commissioner of Patents, Washington, D. C."